United States Patent
He et al.

(10) Patent No.: US 7,979,641 B2
(45) Date of Patent: Jul. 12, 2011

(54) CACHE ARRANGEMENT FOR IMPROVING RAID I/O OPERATIONS

(75) Inventors: Dingshan He, Bellevue, WA (US); Deepak R. Kenchammana-Hosekote, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 12/059,067

(22) Filed: Mar. 31, 2008

(65) Prior Publication Data
US 2008/0270878 A1 Oct. 30, 2008

Related U.S. Application Data

(63) Continuation of application No. 11/741,826, filed on Apr. 30, 2007.

(51) Int. Cl.
*G06F 12/02* (2006.01)
(52) U.S. Cl. ......... 711/129; 711/114; 711/113; 714/801
(58) Field of Classification Search .................. 711/114, 711/113, 173; 714/801
See application file for complete search history.

(56) References Cited

U.S. PATENT DOCUMENTS

| | | | |
|---|---|---|---|
| 6,049,851 A | 4/2000 | Bryg et al. | |
| 6,148,368 A * | 11/2000 | DeKoning | 711/113 |
| 6,523,087 B2 * | 2/2003 | Busser | 711/114 |
| 6,594,698 B1 | 7/2003 | Chow et al. | |
| 6,651,140 B1 | 11/2003 | Kumar | |
| 6,725,392 B1 * | 4/2004 | Frey et al. | 714/6 |
| 6,963,959 B2 | 11/2005 | Hsu et al. | |
| 6,970,987 B1 | 11/2005 | Ji et al. | |
| 7,457,980 B2 * | 11/2008 | Yang et al. | 714/6 |
| 2002/0184442 A1 | 12/2002 | Veitch et al. | |
| 2003/0033572 A1 * | 2/2003 | Walton et al. | 714/763 |
| 2005/0021615 A1 | 1/2005 | Arnott et al. | |
| 2005/0071599 A1 | 3/2005 | Modha et al. | |
| 2005/0289402 A1 | 12/2005 | Nerl et al. | |

OTHER PUBLICATIONS

Jong-Hoon Kim et al., "Studies on striping and buffer caching issues for the software RAID file system", Journals of Systems Architecture: the EUROMICRO Journal, vol. 47, May 2002, p. 923-936.*

(Continued)

*Primary Examiner* — Kevin L Ellis
*Assistant Examiner* — Sam Chen
(74) *Attorney, Agent, or Firm* — Gibb I.P. Law Firm, LLC; Mohammed Kashef, Esq.

(57) ABSTRACT

The embodiments of the invention provide a method, apparatus, etc. for a cache arrangement for improving RAID I/O operations. More specifically, a method begins by partitioning a data object into a plurality of data blocks and creating one or more parity data blocks from the data object. Next, the data blocks and the parity data blocks are stored within storage nodes. Following this, the method caches data blocks within a partitioned cache, wherein the partitioned cache includes a plurality of cache partitions. The cache partitions are located within the storage nodes, wherein each cache partition is smaller than the data object. Moreover, the caching within the partitioned cache only caches data blocks in parity storage nodes, wherein the parity storage nodes comprise a parity storage field. Thus, caching within the partitioned cache avoids caching data blocks within storage nodes lacking the parity storage field.

16 Claims, 7 Drawing Sheets

OTHER PUBLICATIONS

Sheng-Kai Hung, Yarsun Hsu., "DPCT: Distributed Parity Cache Table for Redundant Parallel File System", High Performance Computing and Communications, Second International Conference, HPCC 2006, Sep. 13-15, 2006, vol. 4208 of Lecture Notes in Computer Science, p. 320-329.*

Sunil Mishra, Prasant Mohapatra, "Performance Study of RAID-5 Disk Arrays with Data and Parity Cache", In Proceedings of the 25th International Conference on Parallel Processing, vol. I, Architecture, 1996.*

He et al., U.S. Appl. No. 11/741,826, Office Action Communication, Jul. 21, 2009, 9 pages.

* cited by examiner

| Operation | | Savings with CAIRO | |
|---|---|---|---|
| | Disk IO | Memory Bandwidth | Network Bandwidth |
| Fault-free short write | 100% | 50% | 100% |
| Degraded read | 200% | 22% | 200% |
| Degraded short write | 200% | 22% | 200% |

FIG. 1

| Plan | Description | Condition under which applicable |
|---|---|---|
| PI@CN | Standard parity increment. | |
| PC@CN | Read in the clean pages in the stripe and do parity compute(PC). | A majority (or more) of dirty pages and/or clean pages for a stripe are in CN's cache. |
| PC-Δ@CN | PN calculates Δ from clean pages in its cache and transmits it to CN, which calculates $P_{new}$. | Atleast a majority of dirty pages and/or clean pages for a stripe are in PN's cache |
| PI-Δ@CN | CN reads $D_{old}$ computes Δ and transmits it to PN to calculate $P_{new}$. | There are no relevant pages in CN's cache |
| PI-Δ@TN | CN directly writes $D_{new}$ to TN, who calculates Δ and sends it to PN. PN uses Δ to calculate $P_{new}$ | Minority dirty pages in a stripe w/o enough clean pages in cache |
| PC@PN | Dirty pages and missing clean pages are shipped to PN for calculating $P_{new}$. | PN has clean pages for the stripe cached and can cache additional pages. |
| PC-Δ@PN | Δ of dirty pages and missing clean pages are shipped to PN for calculating $P_{new}$ | PN has clean pages for the stripe cached but doesn't want to cache additional pages. |

FIG. 2

| SN1 | SN2 | SN3 | SN4 | SN5 |
|---|---|---|---|---|
| D1 | D2 | D3 | D4 | P |

FIG. 6

| SN1 | SN2 | SN3 | SN4 | SN5 |
|---|---|---|---|---|
| 1 | 2 | 3 | 4 | P1 |
| 6 | 7 | 8 | P2 | 5 |
| 11 | 12 | P3 | 9 | 10 |

FIG. 7A

| node | Stored blocks | Cache-able blocks |
|---|---|---|
| SN1 | 1,6,11 | |
| SN2 | 2,7,12 | |
| SN3 | 3,8,P3 | 9,10,11,12 |
| SN4 | 4,9,P2 | 5,6,7,8 |
| SN5 | 5,10,P1 | 1,2,3,4 |

FIG. 7B

CACHE ARRANGEMENT FOR IMPROVING RAID I/O OPERATIONS

CROSS-REFERENCE TO RELATED APPLICATIONS

This application is a continuation of U.S. application Ser. No. 11/741,826 filed Apr. 30, 2007, the complete disclosure of which, in its entirety, is herein incorporated by reference.

BACKGROUND

1. Field of the Invention

The embodiments of the invention provide a method, apparatus, etc. for a cache arrangement for improving RAID I/O operations.

2. Description of the Related Art

It is often necessary in a distributed storage system to read or write data redundantly that has been striped on more than one storage server (or target). Such a system configuration is referred to as a "network-RAID" (redundant array of independent disks) because the function of a RAID controller is performed by the network protocol of the distributed storage system by coordinating I/O (input/output) operations that are processed at multiple places concurrently in order to ensure correct system behavior, both atomically and serially. Distributed storage systems using a network-RAID protocol can process, or coordinate, a network-RAID-protocol I/O request (I/O request) locally at a client node or the request can be forwarded to a storage server or a coordination server for processing. For example, one client node may locally write data to a particular data location, while another client node may choose to forward a read or a write request for the same data location to a shared, or coordination, server.

SUMMARY

The embodiments of the invention provide a method, apparatus, etc. for a cache arrangement for improving RAID I/O operations. More specifically, a method for cache management within a distributed data storage system begins by partitioning a data object into a plurality of data blocks and creating one or more parity data blocks from the data object. Next, the data blocks and the parity data blocks are stored within storage nodes.

Following this, the method caches data blocks within a partitioned cache, wherein the partitioned cache includes a plurality of cache partitions. The cache partitions are located within the storage nodes, wherein each cache partition is smaller than the data object. Moreover, the caching within the partitioned cache only caches data blocks in parity storage nodes, wherein the parity storage nodes comprise a parity storage field. Thus, caching within the partitioned cache avoids caching data blocks within storage nodes lacking the parity storage field. When the storage nodes comprise more than one parity storage node, the data blocks are cached in any of the parity storage nodes.

The method further includes updating the data object. Specifically, a write request is annotated with information regarding changed data blocks within the data object; and, the write request is only sent to the parity storage nodes. The sending of the write request only to the parity storage nodes comprises simultaneously performing an invalidation operation and a write operation. Subsequently, the data blocks and parity data block are read from the storage nodes.

An apparatus for cache management within a distributed data storage system is also provided. More specifically, the apparatus comprises a partitioner to partition a data object into a plurality of data blocks. An analysis engine is operatively connected to the partitioner, wherein the analysis engine creates one or more parity data blocks from the data object. Moreover, a controller is operatively connected to the analysis engine, wherein the controller stores the data blocks and the parity data blocks within storage nodes.

The controller also caches data blocks within a partitioned cache, wherein the partitioned cache includes a plurality of cache partitions. The cache partitions are located within the storage nodes, wherein each cache partition is smaller than the data object. When caching within the partitioned cache, the controller only caches data blocks in parity storage nodes, wherein the parity storage nodes have a parity storage field. Thus, when caching, the controller avoids caching data blocks within storage nodes lacking the parity storage field. When the storage nodes have more than one parity storage node, the controller caches the data blocks in any of the parity storage nodes.

Additionally, the controller annotates a write request with information regarding changed data blocks within the data object and sends the write request to the parity storage nodes. The controller simultaneously performs an invalidation operation and a write operation. The apparatus further includes a reader operatively connected to the controller, wherein the reader reads the data blocks and the parity data blocks from the storage nodes.

Accordingly, the embodiments of the invention provide a technique to build a lightweight cache coherence protocol in distributed storage systems by exploiting the update patterns inherent with erasure coded data. Such a technique can unify the partitioned caches into a single large read cache and can use the cached data to improve RAID I/O operations from clients.

BRIEF DESCRIPTION OF THE DRAWINGS

The embodiments of the invention will be better understood from the following detailed description with reference to the drawings, in which:

FIG. 1 is a table illustrating benefits of caching while executing write and reconstruct read operations;

FIG. 2 is a table illustrating an enumeration of the type of plans generated by the embodiments of the invention;

FIG. 6 is a diagram illustrating a data object stripe;

FIGS. 7A and 7B are diagrams illustrating cache arrangement for improving RAID I/O operations;

DETAILED DESCRIPTION OF PREFERRED EMBODIMENTS

Figure 3B:
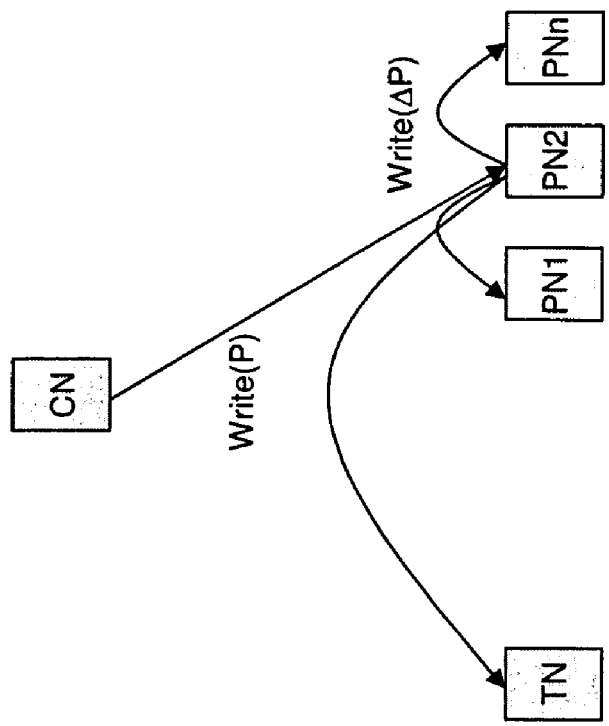
FIGS. 3A and 3B are diagrams illustrating two variants of I/O update topology for distributed RAID that keep data in sync.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

The embodiments of the invention provide a technique to build a lightweight cache coherence protocol in distributed storage systems by exploiting the update patterns inherent with erasure coded data. Such a technique can unify the partitioned caches into a single large read cache and can use the cached data to improve RAID I/O operations from clients.

Erasure coded data benefits the most from caching while executing write and reconstruct read operations. FIG. 1 illustrates a table showing the benefits. Specifically, an example of savings with the embodiments of the invention is shown when the underlying distributed RAID layout is RAID5 over 4 nodes. The savings comes from exploiting the cache state at various nodes of a distributed RAID system. Pages for a given stripe could be in the read cache at one or more parity node(s), data nodes and/or client nodes. Embodiments herein can deliver such savings when the working set exceeds the total cache size of a single client node. Brick systems may have more (aggregate) cache space fronting the drives as comparable RAID controllers. Phrased another way, for the same cost of the system, more aggregate cache can be included in a brick system than in a monolithic system.

To make effective use, dispersed cache requires some cache coherence scheme, which comprises of two parts. First, a scalable cache directory needs to map pages to nodes. Second, an invalidation (or coherence) protocol is needed to ensure correctness. With erasure codes, read/write performance of data in degraded/critical mode is significantly slower than under fault-free mode. If at least the working set is cached somewhere until the rebuild operation completes, then read/write performance can be improved. Specifically, given a cache arrangement scheme, the execution of a RAID read or write operation at a node can be optimized by leveraging pages that are in the caches of the different nodes.

Considering data laid out in some erasure code layout (e.g., RAID5), for each data stripe, a subset of the bricks take on different roles. Each brick stores a stripe of data for which it is the target node (TN). For each stripe, there will be at least t pages to store parity for a t-fault tolerant code. Each parity page is stored on a different parity node (PN). Client nodes (CN) are also provided. From the perspective of any dirty data page, the multiple nodes in the system are categorized as described below. CN is the client node that initiates the flush of this dirty page; and, TN is the target node to which the dirty data page should be written. {PN} is the parity node that hosts the parity page that depends on the dirty data page. There can be multiple parities depending on the layout, which is indicated by the curved brackets. {DN} is the dependent node that hosts the dependent data (dD) contributing to the calculation of the same parity as the dirty page.

The XOR calculations for new parity can be performed at any one or combination of these nodes. Locally, each of the above nodes can have one of two plans: parity compute (PC) or parity increment (PI). Additionally, two issues need to be addressed. The first issue is how each kind of nodes derive their own best I/O plan. The second issue is how different nodes interact with each other to get an agreement on the final I/O plan.

FIG. 2 illustrates a table, which enumerates all possible I/O plans possible amongst these nodes for a given dirty page. The overarching notation is that a write changes $D_{old}$ to $D_{new}$ which requires updating the relevant parity page from $P_{old}$ to $P_{new}$. In some schemes, a partial parity is used as $\Delta = D_{new}$ xor $D_{old}$. Next, a method is presented to derive the best local I/O plan and the communication protocol to allow different nodes to reach an agreement on the final I/O plan.

Data pages can be cached only at parity nodes that depend on it. When an update to the data page occurs (at CN) the invalidation can be piggybacked on the that operation to the new parity page (to PN). PN is guaranteed to get an update operation due to how redundancy is maintained i.e., erasure coding. In other words, if data pages are cached at the parity node(s), the new data is always in the parity nodes. This can be checked during read to that data by any CN. The unchanged data, which is not in the parity nodes, are not invalidated.

Figure 3A:
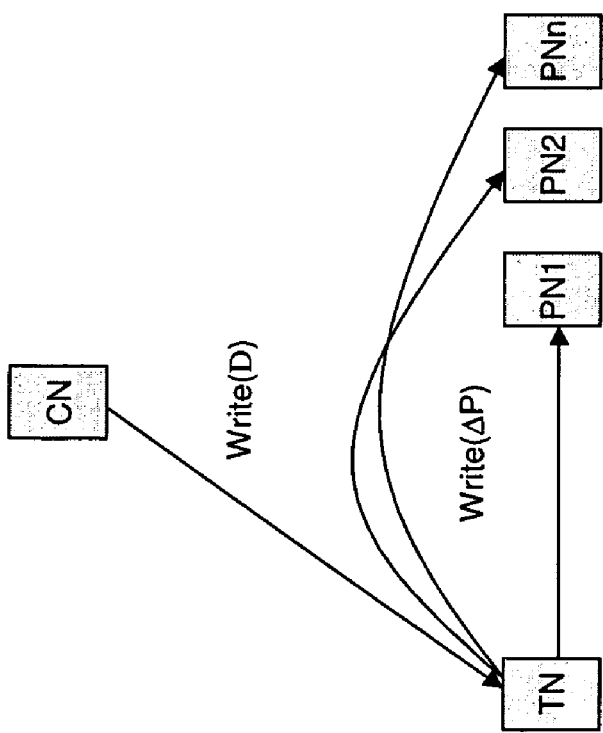

Beyond just invalidation, by employing certain client write I/O plans, this cache at the parity node(s) can be kept in sync without any extra messaging. FIGS. 3A and 3B illustrate two such I/O plans (each employing the parity increment with $\Delta$). Specifically, in FIG. 3A, CN writes new data to the target node, computes $\Delta$, and ships it to the affected parity nodes to be applied. In FIG. 3B, CN writes new data to the parity node with old data. This parity node computes $\Delta$ and ships it to the target and other parity nodes to be applied.

Figure 4A:
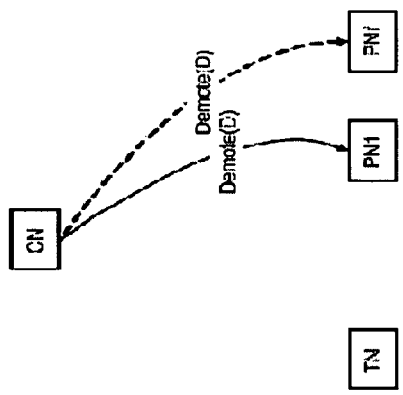
FIGS. 4A, 4B, 4C, and 4d are diagrams illustrating four ways to prime the cache at the parity nodes to improve RAID I/O operations in distributed RAID storage systems.
Figure 4C:
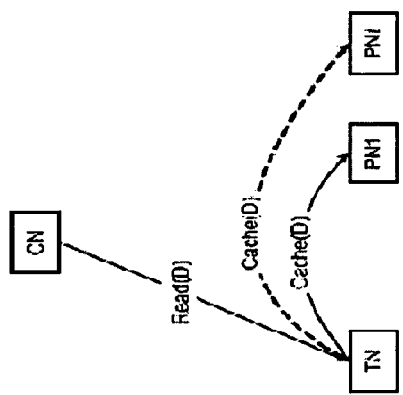
Figure 4B:
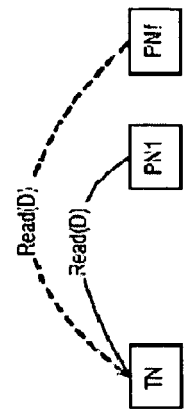
Figure 4D:
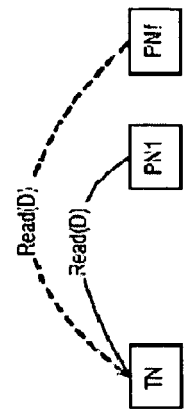

As illustrated in FIGS. 4A, 4B, 4C, and 4D, four alternatives are provided to describe how the parity node(s) gather data pages from client or target nodes. In FIG. 4A, the target node (in response to a client read) ships the data to one or more parity nodes. In FIG. 4B, the client demotes a clean page it would have discarded to one or more parity nodes. Further, in FIG. 4C, the target demotes the page to the parity node. In FIG. 4D, the parity node asynchronously reads pages from the target node.

If both TN and one or more PNs cache a data block, the effective cache size is reduced. This leads to greater cache pressure on (global pool) cache pages. To avoid this, three rules for caching data are provided. First, TN does not read cached data pages except during system transience (writing, buffering). This makes TN's cache exclusive. Second, when the erasure code allows for multiple PN's, then any one can be chosen (e.g., randomly). Third, the first rule is not applicable to parity pages, which can cached during transience.

With this caching scheme in place, embodiments herein can use one round of messages to gather all candidate I/O plan costs from all t PN's and compare with the local plans available to CN and pick the best plan. In degraded/critical mode, reconstructed pages are held at the parity node longer (until rebuild completes or cache pressure builds sufficiently) for possible reuse by another client. As discussed above, if at least the working set is cached somewhere until the rebuild operation completes, then read/write performance can be improved. Specifically, given a cache arrangement scheme, the execution of a RAID read or write operation at a node can be optimized by leveraging pages that are in the caches of the different nodes.

Thus, while cache invalidation is piggybacked on write operations, priming caches at the parity nodes takes some extra work. Moreover, read operations will need two phases, including a first phase to exchange plans. Write operations may require 3 phases, including a first phase to exchange plans (but here is an opportunity to piggyback). Further, by location shifting the cache, the impact it will have on local I/O optimizations (like prefetching etc.) is unknown.

The embodiments herein can be applied to distributed (clustered) storage systems. For such systems, the embodiments of the invention have the ability to provide read cache unification and to improve RAID I/O operations.

Furthermore, the embodiments of the invention provide a distributed cache management scheme for a storage system that uses erasure coded distributed RAID and has partitioned cache (where the total sum can be fairly substantial). This speeds up RAID reads and writes by leveraging cached data, where possible. Moreover, this unifies the cache, which maximizes cache effectiveness. There is no duplication of cached data. The cache management scheme is lightweight; no (additional) messaging for cache coherence or a data directory is needed. The management scheme is also opportunistic; any steps can be skipped under a heavy load without affecting correctness.

Figure 5:
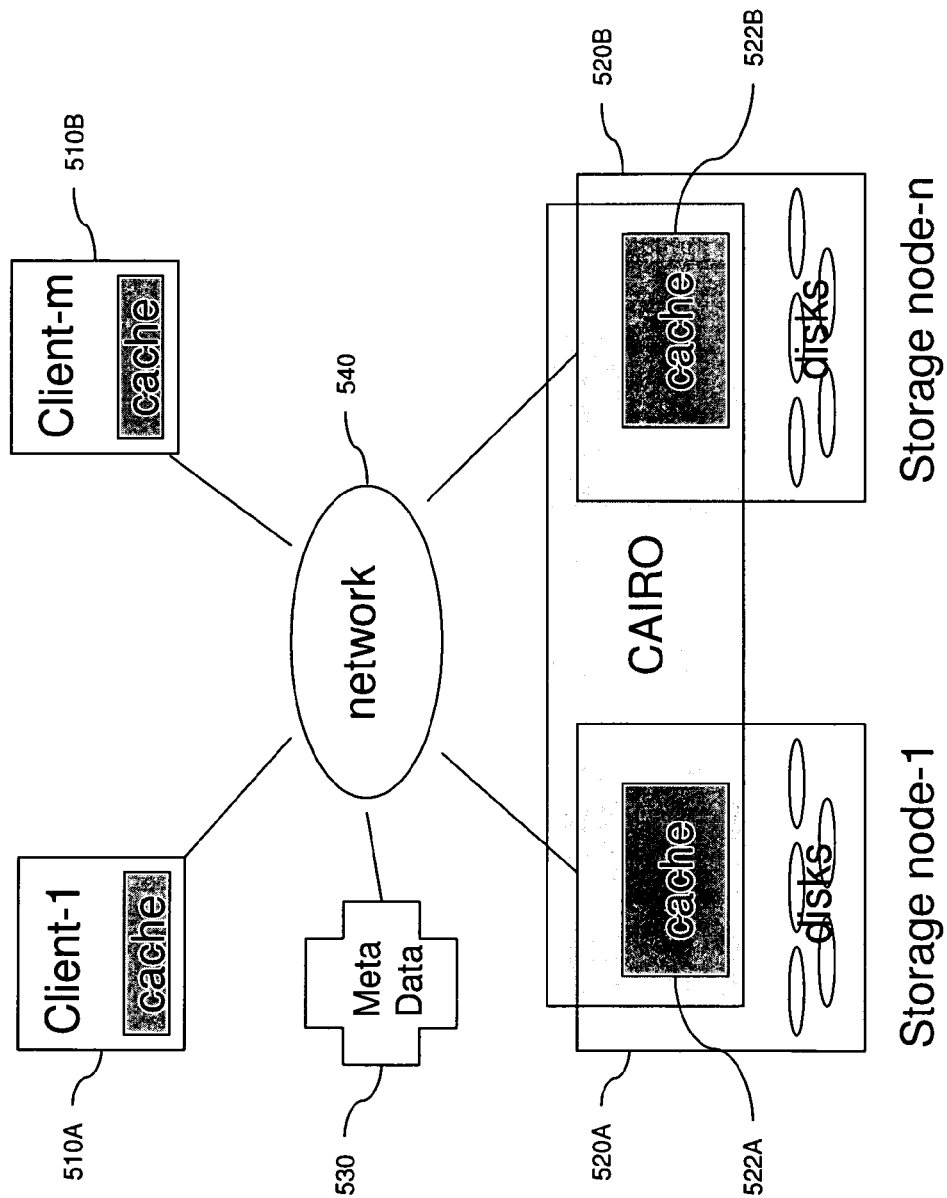
FIG. 5 is a diagram illustrating a system for a cache arrangement for improving RAID I/O operations.

FIG. 5 is a diagram illustrating a system for such a cache arrangement scheme. The initiator for read or write operations to the dRAID volume can be at a client node 510A or 510B (direct access) or a storage node 520A or 520B (gateway). Meta-data 530 is available to the initiator via a network 540. The storage nodes 520A/520B could have a write and read cache or a read cache only (cache 522A/522B). A dRAIDed stripe is spread across the storage nodes 520A/520B, wherein the system assumes uniformly spread storage.

FIG. 6 is a diagram illustrating a data object stripe within five storage nodes (SN1, SN2, SN3, SN4, and SN5). The data object stripe includes a first data block (D1), a second data block (D2), a third data block (D3), a fourth data block (D4), and a parity block (P). The role of a storage node for a data block can be a client node (CN), parity node (PN), or target node (TN). Each storage node can play multiple roles for different blocks. Thus, SN3 is the target node for D3; SN5 is the parity node; and, any of the storage nodes can be a client node.

Embodiments of the invention provide the following cache rules. First, each write request from a client is annotated with information about changed blocks within a stripe. Thus, cache invalidation is piggybacked onto regular operations. Second, data blocks can be cached only at parity node(s). Multiple candidates exist for higher distance codes; and, no separate cache directory is needed. Third, data blocks are not cached at the target node, except by the operating system as staging during read/write operations. The "home" location of data is shifted from a target node to a parity node. Fourth, clients "demote" victim data page to parity node(s). In case of a higher distance code, a lexicographical parity node is chosen. Such a parity node primes caches in storage nodes opportunistically from clients. Fifth, a client or storage node can locally decide to evict (clean) pages. This provides for loosely coupled caching.

Consequences of the cache rules provide that data pages from multiple clients get "percolated" into caches in storage nodes, which is advantageous for shared workloads without clients even cooperating. This is irrelevant for totally random workloads, which are no worse than before. Moreover, caches at storage nodes are aligned in a "RAID-friendly" way. All data used to compute a parity block localized. Further, due to the nature of erasure code updates, cache coherence is free. Parity node(s) have to be written to for write completion. Annotation helps identify which blocks have changed.

FIGS. 7A and 7B are diagrams illustrating cache arrangement for improving RAID I/O operations. FIG. 7A illustrates storage node 1 (SN1), which includes data blocks 1, 6, and 11. Storage node 2 (SN2) includes data blocks 2, 7, and 12; and, storage node 3 (SN3) has data blocks 3 and 8, and parity block 3 (P3). Additionally, storage node 4 (SN4) includes data blocks 4 and 9, and parity block 2 (P2); and, storage node 5 (SN5) has data blocks 5 and 10, and parity block 1 (P1). Thus, as illustrated in FIG. 7B, data blocks are only cached in storage nodes having parity blocks (i.e., SN3, SN4, and SN5).

Reads and writes include an extra messaging phase to query the cache state at parity node(s). Client costs various read/update plans possible around metrics, such as disk IOs and memory bandwidth. The client chooses the best plan and drives I/O.

Read plan choices include finding the cheapest reconstruction plan in three steps: inverting the matrix; masking cached pages; and, cost planning. Possible locations include the client node and parity node(s).

Beyond distributed RAID, the embodiments herein are applicable to a class of problems that requires coordination of a distributed cache resource and updates to a set of data blocks that require updates to some common (dependent) block(s). Such systems could include distributed databases and cluster file systems.

Thus, the embodiments of the invention provide a distributed cache arrangement for a storage system that speeds up RAID operations where workload is conducive. The working set is larger than any single client cache but it fits in the collective cache. A shared data set exists between the clients but the data set is time shifted. Moreover, the cache arrangement adjusts automatically to workloads from clients. If there is a shared workload, then there is a benefit; otherwise, the cache arrangement exploits collective cache space.

Figure 8:
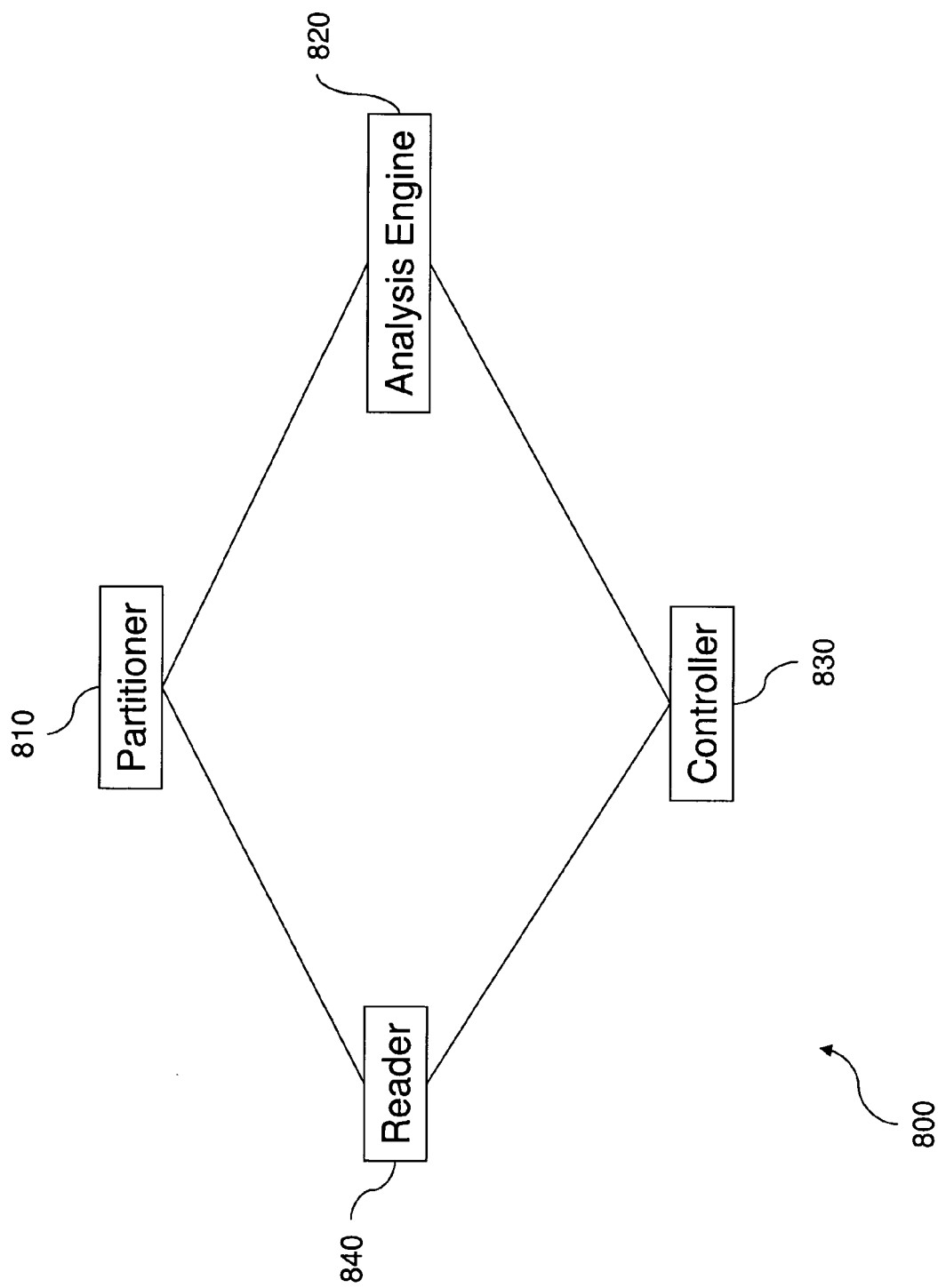
FIG. 8 is a diagram illustrating an apparatus for cache management within a distributed data storage system.

Referring to FIG. 8, an apparatus 800 for cache management within a distributed data storage system is illustrated. More specifically, a partitioner 810 is provided to partition a data object into a plurality of data blocks. An analysis engine 820 is operatively connected to the partitioner 810, wherein the analysis engine 820 creates one or more parity data blocks from the data object. For example, as illustrated in FIG. 6, the data object stripe includes a first data block (D1), a second data block (D2), a third data block (D3), a fourth data block (D4), and a parity block (P). Furthermore, a controller 830 is operatively connected to the analysis engine 820, wherein the controller 830 stores the data blocks and the parity data block within storage nodes. For example, as illustrated in FIGS. 7A and 7B, the data blocks 1-12 and the parity data blocks P1-P3 are stored within the storage nodes SN1-SN5.

The controller 830 also caches the data blocks within a partitioned cache, wherein the partitioned cache includes cache partitions. The cache partitions are located within the storage nodes, wherein each cache partition is smaller than the data object (e.g., volume, LUN, file system). More specifically, each cache partition is located within a storage node. When caching within the partitioned cache, the controller 830 only caches the data blocks in parity storage nodes, wherein the parity storage nodes include a parity storage field (a field within a storage node where parity data block(s) can be stored). Thus, the controller 830 avoids caching data blocks within storage nodes lacking the parity storage field. For example, as illustrated in FIGS. 7A and 7B, data blocks 1-12 are only cached within the storage nodes having stored parity data blocks. In this example, parity data blocks P1, P2, and P3 are stored in storage nodes SN5, SN4, and SN3, respectively.

When caching within the partitioned cache, and when the storage nodes comprise more than one parity storage node, the controller 830 caches the data blocks in any of the parity storage nodes. Moreover, the controller 830 annotates a write request with information regarding changed data blocks within the data object and sends the write request to the parity storage nodes. The controller 830 simultaneously performs an invalidation operation and a write operation. Additionally, a reader 840 is operatively connected to the controller 830, wherein the reader 840 reads the data blocks and the parity data block from the storage nodes.

Figure 9:
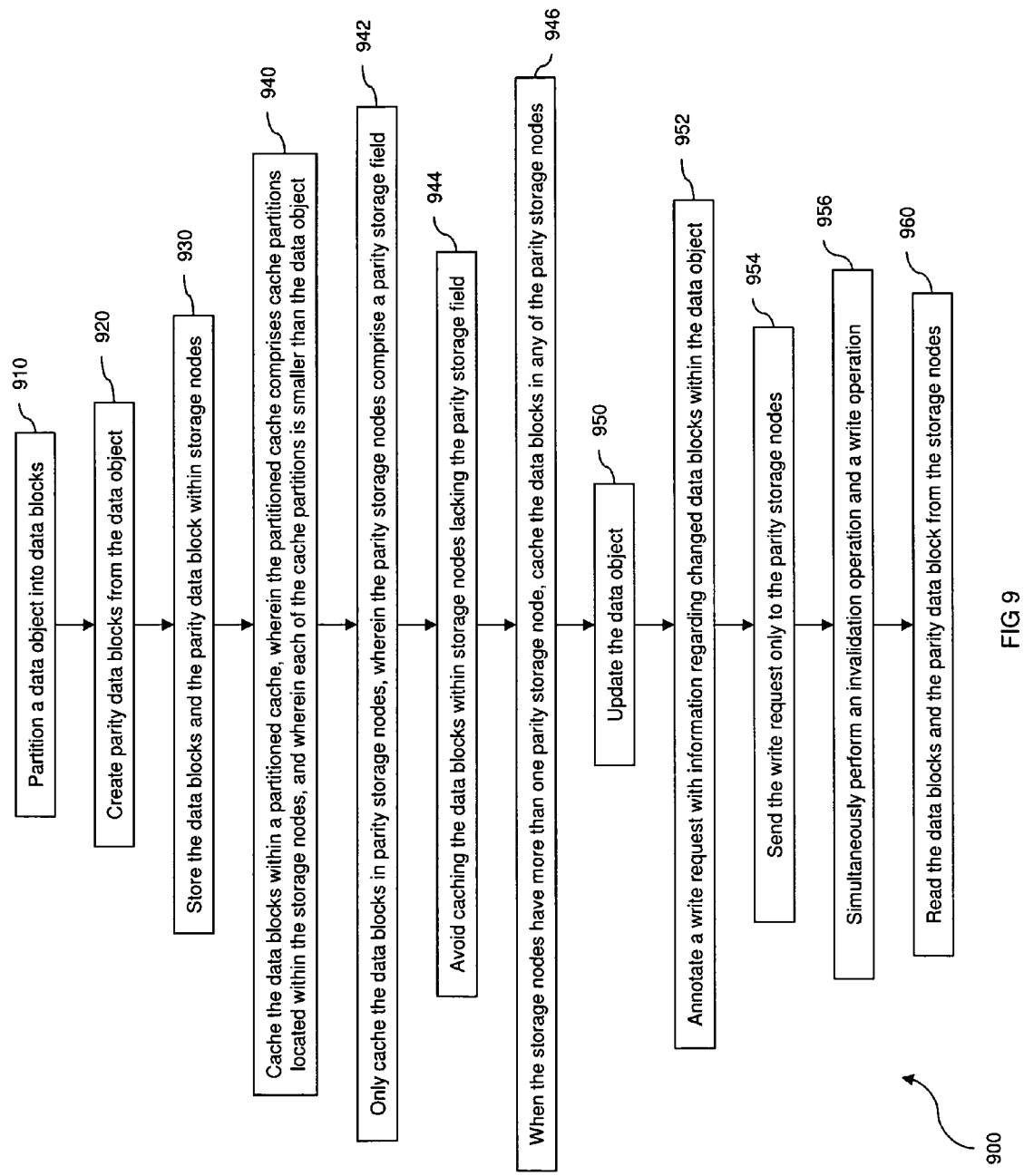
FIG. 9 is a flow diagram illustrating a method for cache management within a distributed data storage system.

Referring to FIG. 9, a method 900 for cache management within a distributed data storage system is illustrated. More specifically, the method 900 begins in item 910 by partitioning a data object into data blocks. Next, in item 920, one or more parity data blocks are created from the data object. As described above, FIG. 6 illustrates a data object stripe having a first data block (D1), a second data block (D2), a third data block (D3), a fourth data block (D4), and a parity block (P). Following this, in item 930, the data blocks and the parity data block are stored within storage nodes. As described above, the role of a storage node for a data block can be a client node (CN), a parity node (PN), or a target node (TN). Each storage node can play multiple roles for different blocks.

In item 940, the data blocks are also cached within a partitioned cache, wherein the partitioned cache includes cache partitions. The cache partitions are located within the storage nodes, wherein each cache partition is smaller than the data object. As described above, the storage nodes could have a write and read cache or a read cache only. Moreover, the caching within the partitioned cache only caches the data blocks in parity storage nodes, wherein the parity storage nodes include a parity storage field (item 942). Thus, caching the data blocks within storage nodes lacking the parity storage field is avoided (item 944). Accordingly, as described above, a separate cache directory is not required because the cached data blocks are only in the parity storage nodes.

When caching the data blocks within the partitioned cache, and when the storage nodes have more than one parity storage node, the data blocks are cached in any of the parity storage nodes (item 946). As described above, FIGS. 4A, 4B, 4C, and 4D illustrate four alternatives to describe how the parity node(s) gather data pages from client or target nodes. In FIG. 4A, the target node (in response to a client read) ships the data to one or more parity nodes. In FIG. 4B, the client demotes a clean page it would have discarded to one or more parity nodes. Further, in FIG. 4C, the target demotes the page to the parity node. In FIG. 4D, the parity node asynchronously reads pages from the target node.

The method 900 also includes, in item 950, updating the data object. This includes annotating a write request with information regarding changed data blocks within the data object (item 952) and sending the write request only to the parity storage nodes (item 954). The sending of the write request only to the parity storage nodes comprises simultaneously performing an invalidation operation and a write operation (item 956). Thus, as described above, cache invalidation is piggybacked onto regular operations. Due to the nature of erasure code updating, cache coherence is free because parity node(s) have to be written to for a write completion. Annotation helps identify which blocks have changed. Subsequently, in item 960, the data blocks and parity data block are read from the storage nodes. The method 900 can check the cache at the parity storage nodes before reading the data block from the target storage nodes.

Accordingly, the embodiments of the invention provide a technique to build a lightweight cache coherence protocol in distributed storage systems by exploiting the update patterns inherent with erasure coded data. Such a technique can unify the partitioned caches into a single large read cache and can use the cached data to improve RAID I/O operations from clients.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A method for cache management within a distributed data storage system, said method comprising:
    partitioning a data object into a plurality of data blocks;
    creating at least one parity data block from said data object;
    storing said plurality of data blocks within a plurality of storage nodes;
    storing said at least one parity data block within at least one of said plurality of storage nodes;
    caching said plurality of data blocks only within partitioned caches located within said plurality of storage nodes that store said at least one parity data block; and
    reading said plurality of data blocks, said at least one parity data block from said plurality of storage nodes and said cached plurality of data blocks from said partitioned cache,
    said caching within said partitioned cache comprises avoiding caching said plurality of data blocks within said plurality of storage nodes lacking said parity storage field.

2. The method according to claim 1, further comprising updating said data object, said updating comprising:
    annotating a write request with information regarding changed data blocks within said data object; and
    sending said write request only to said parity storage nodes.

3. The method according to claim 2, wherein said sending of said write request only to said parity storage nodes comprises simultaneously performing an invalidation operation and a write operation.

4. The method according to claim 1, wherein said caching of said plurality of data blocks within said partitioned cache comprises, when said plurality of storage nodes comprise more than one of said parity storage nodes, caching said plurality of data blocks in any of said parity storage nodes.

5. The method according to claim 1, wherein each of said plurality of cache partitions is smaller than said data object.

6. A method for cache management within a distributed data storage system, said method comprising:
    partitioning a data object into a plurality of data blocks;
    creating at least one parity data block from said data object;
    storing said plurality of data blocks within a plurality of storage nodes;
    storing said at least one parity data block within at least one of said plurality of storage nodes;
    caching said plurality of data blocks only within partitioned caches located within said plurality of storage nodes that store said at least one parity data block;
    updating said data object, said updating comprising:
        annotating a write request with information regarding changed data blocks within said data object; and
        sending said write request only to said plurality of parity storage nodes; and reading said plurality of data blocks and said at least one parity data block from said plurality of storage nodes and said cached plurality of data blocks from said partitioned cache located within said plurality of storage nodes, said caching within said partitioned cache comprises avoiding caching said plurality of data blocks within said plurality of storage nodes lacking said parity storage field.

7. The method according to claim 6, wherein said sending of said write request only to said parity storage nodes further comprises:

simultaneously performing an invalidation operation and a write operation.

8. The method according to claim 6, wherein said caching of said plurality of data blocks within said partitioned cache comprises, when said storage nodes comprise more than one of said parity storage nodes, caching said plurality of data blocks in any of said parity storage nodes.

9. An apparatus for cache management within a distributed data storage system, said apparatus comprising:

a partitioner adapted to partition a data object into a plurality of data blocks;

an analysis engine operatively connected to said partitioner, wherein said analysis engine is adapted to create at least one parity data block from said data object;

a controller operatively connected to said analysis engine, wherein said controller is adapted to:

store said plurality of data blocks within a plurality of storage nodes;

store said at least one parity data block within at least one of said plurality of parity storage nodes; and cache said plurality of data blocks only within partitioned caches located within said plurality of storage nodes that store said at least one parity data block; and a reader operatively connected to said controller, wherein said reader is adapted to read said plurality of data blocks and said at least one parity data block from said plurality of storage nodes and said plurality of data blocks cached in said partitioned cache located within said plurality of storage nodes, said controller is adapted to, when caching within said partitioned cache, avoid caching said plurality of data blocks within said plurality of storage nodes lacking said parity storage field.

10. The apparatus according to claim 9, wherein said controller is adapted to:

annotate a write request with information regarding changed data blocks within said data object; and send said write request to said parity storage nodes.

11. The apparatus according to claim 10, wherein said controller is adapted to simultaneously perform an invalidation operation and a write operation.

12. The apparatus according to claim 9, wherein said controller is adapted to, when caching within said partitioned cache, and when said plurality of storage nodes comprise more than one of said parity storage nodes, cache said plurality of data blocks in any of said parity storage nodes.

13. The apparatus according to claim 9, wherein each of said cache partitions is smaller than said data object.

14. An apparatus for cache management within a distributed data storage system, said apparatus comprising:

a partitioner adapted to partition a data object into a plurality of data blocks;

an analysis engine operatively connected to said partitioner, wherein said analysis engine is adapted to create at least one parity data block from said data object;

a controller operatively connected to said analysis engine, wherein said controller is adapted to:

store said plurality of data blocks within a plurality of storage nodes;

store said at least one parity data block within at least one of said plurality of storage nodes; and cache said plurality of data blocks only within partitioned caches located within said plurality of storage nodes that store said at least one parity data block;

annotate a write request with information regarding changed data blocks within said data object; and send said write request to said storage nodes containing said partitioned cache; and a reader operatively connected to said controller, wherein said reader is adapted to read said plurality of data blocks and said at least one parity data block from said storage nodes and said plurality of data blocks cached in said partitioned cache located within said plurality of storage nodes, said controller is adapted to, when caching within said partitioned cache, avoid caching said plurality of data blocks within said plurality of storage nodes lacking said parity storage field.

15. The apparatus according to claim 14, wherein said controller is adapted to simultaneously perform an invalidation operation and a write operation.

16. The apparatus according to claim 14, wherein said controller is adapted to, when caching within said partitioned cache, and when said plurality of storage nodes comprise more than one of said parity storage nodes, cache said data blocks in any of said parity storage nodes.

* * * * *